United States Patent [19]

Ieda et al.

[11] 4,055,914

[45] Nov. 1, 1977

[54] SOUND PRODUCING DEVICE

[75] Inventors: Michael Ieda, Fort Solanga; Walter Friedman, Centereach, both of N.Y.

[73] Assignee: Ideal Toy Corporation, Hollis, N.Y.

[21] Appl. No.: 672,230

[22] Filed: Mar. 31, 1976

[51] Int. Cl.[2] .............................................. A63H 5/00
[52] U.S. Cl. ..................................... 46/192; 116/144
[58] Field of Search ................ 46/191, 192, 189, 111, 46/112, 174, 177, 232, 175 R; 116/143, 144, 145

[56] References Cited

U.S. PATENT DOCUMENTS

| 1,232,603 | 7/1917 | Proctor | 116/144 |
| 1,374,367 | 4/1921 | Dodd | 116/145 |
| 2,734,310 | 2/1956 | Christopher | 46/177 |

Primary Examiner—Louis G. Mancene
Assistant Examiner—Mickey Yu
Attorney, Agent, or Firm—Richard M. Rabkin

[57] ABSTRACT

The sound producing device is adapted to be mounted on the handlebars of a bicycle and can produce sound which will simulate the sounds of an internal combustion engine such as is used in a motorcycle. The device includes a housing and an elongated handle rotatably mounted therein for driving a transmission system including a striker which cyclically strikes a resonator cone to produce the desired noise. The transmission system also includes a one-way clutch which will transmit rotary movement of the handle to the striker only when the handle is rotated in a first direction about its longitudinal axis.

26 Claims, 10 Drawing Figures

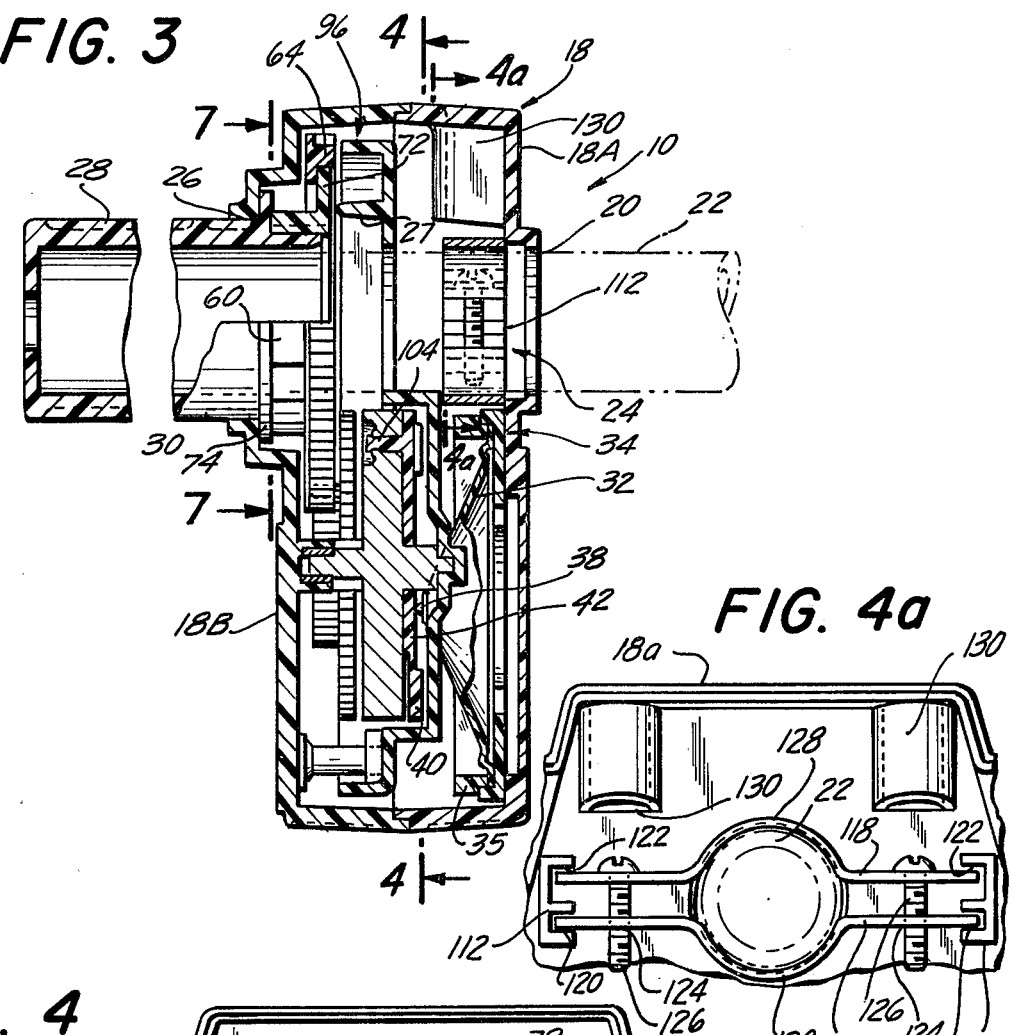
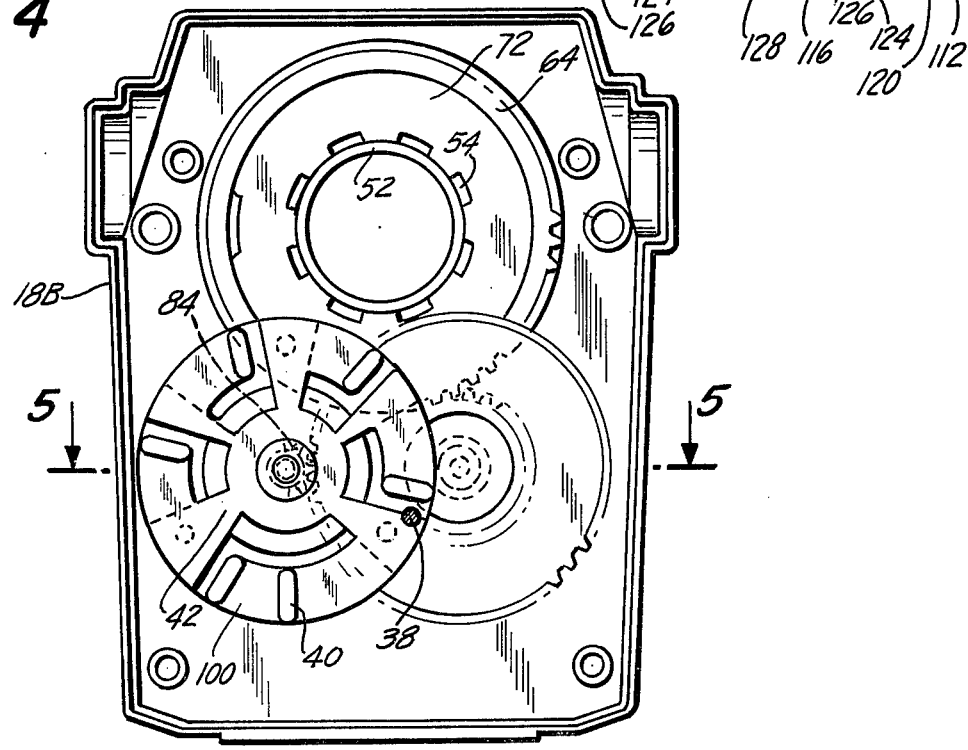

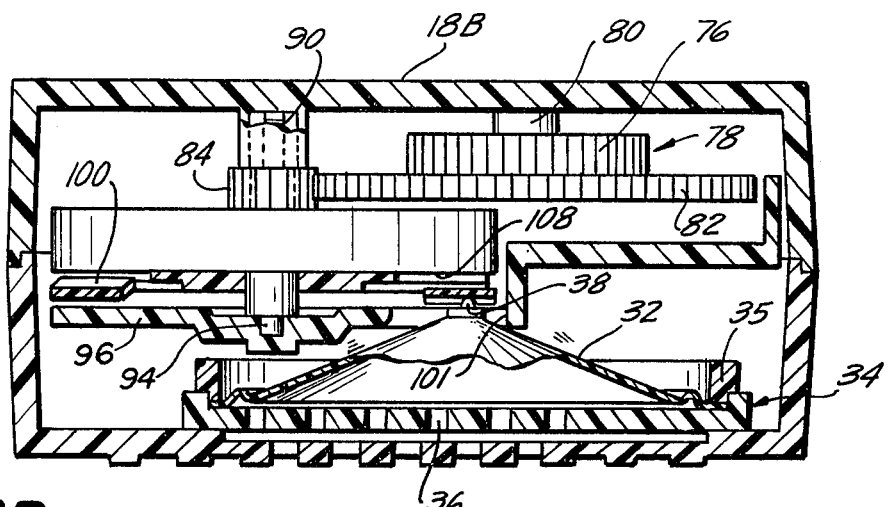
FIG. 5
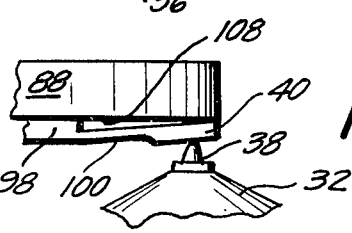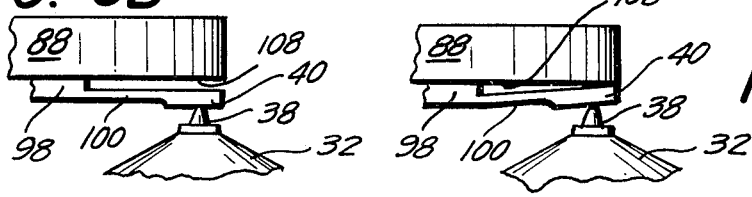
FIG. 6B                    FIG. 6A
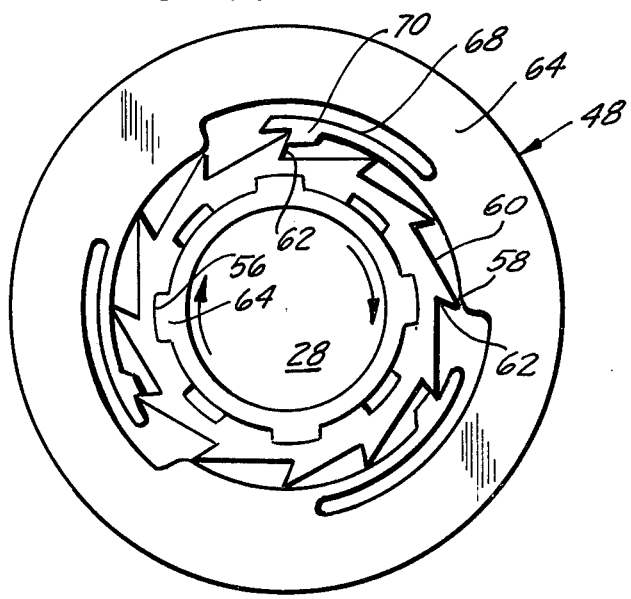 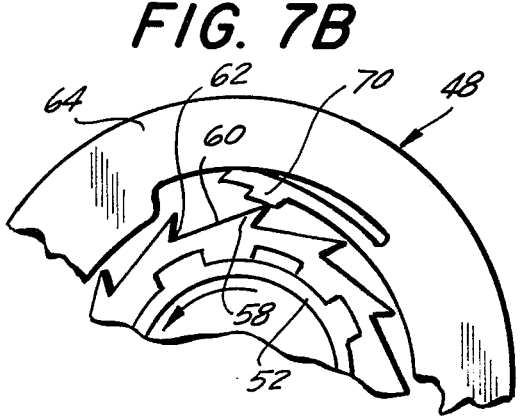
FIG. 7A    FIG. 7B

SOUND PRODUCING DEVICE

The present invention relates to a device for producing sound, and more particularly to a device which will produce sounds closely simulating the sounds of an internal combustion engine such as is used in a motorcycle.

Over the years a variety of different types of sound producing mechanisms have been developed for use in signal horns or to simulate the sounds of a motor vehicle. Perhaps the simplest type of sound producing mechanism uses a flexible reed fixed at one end and engaged at its other end by a rotating ratchet wheel or the like so that upon rotation of the ratchet wheel the reed is vibrated to produce sound. One such device is shown for example in U.S. Pat. No. 3,064,389.

A more sophisticated type of noise producing mechanism used for horns, such as for example the old "clapper" horns often associated with antique motor vehicles, use a flexible diaphragm which includes a contact or wear piece that is in continuous contact with a rotatable crown cam or toothed wheel. Rotation of the cam or wheel causes their teeth to cyclically engage the contact element on the diaphragm thereby to vibrate the diaphragm and produce the desired sound. Such devices produce sound upon rotation of the contact element in either direction, usually by the manual rotation of a crank or handle. With such devices the toothed gear or crown cam must be precisely located with respect to the contact element on the diaphragm in order for the device to operate properly and thus they do not adequately accommodate any misalignment between the parts as might occur during mass production assembly. Moreover, the continuous contact between the diaphragm's contact element and the striker wheel not only produces considerable water, but also damps part of the vibrations of the diaphragm itself, thereby reducing the amount of sound that could be produced with the diaphragm. These types of sound producing devices are shown for example in U.S. Pat. Nos.: Ref. 14,378; 1,066,037; 1,173,044; 1,230,602; 1,249,255; 1,300,425; 1,336,594; and 1,378,124.

In order to avoid some of the problems inherent with these types of prior art devices resonator systems or horns for producing sounds have been developed which include movable striker elements that are not in continuous contact with the wear piece of the diaphragm, such as for example are shown in U.S. Pat. Nos. 1,180,524; 1,416,425; 3,271,898; 3,326,008, 3,190,034; 3,286,393; 3,286,395; and 3,875,696. For the same reason it has been proposed to provide a separate intermediate striker element between the diaphragm and the vibration device, as shown for example in U.S. Pat. No. 3,386,396.

In accordance with the present invention an improved sound producing device is provided in which a diaphragm is vibrated by a rotating striker mechanism wherein, preferably, only a portion of the striker mechanism cyclically engages the contact element or wear point on the diaphragm. In addition, the sound producing mechanism of the invention is adapted to be mounted on the handlebar of a bicycle and to be operated by a rotatable handle which forms, in effect, an extension of the bicycle's handlebar. The rotatable handle is part of the drive train for rotating the striker mechanism of the sound producing device and is connected to a clutch mechanism which permits the operator to work the handle in a manner to simulate the action of the operator of a conventional internal combustion engine motorcylce. That is, the clutch arrangement in the housing of the sound producing device is arranged to drive the striker mechanism and produce sound when the handle is rotated in one direction about its longitudinal axis but not when the handle is rotated in the opposite direction. This allows the user to simulate the action of a motorcyclist "racing" his engine by oscillating the handlebar fuel control on his motorcylce. Thus the sound producing device is highly attractive to bicycle users, particularly in that it enables the user to simulate the actions of the operator of a conventional motorcycle.

Moreover, by the construction of the striker arrangement as described hereinafter, the sound producing device of the invention is particularly adapted for mass production operations so that slight misalignments between the striker mechanism and the sound producing diaphragm will be accommodated without affecting the operation and noise producing effect of the device.

Accordingly, it is an object of the present invention to provide a sound producing device which will simulate the sounds of an internal combustion engine.

It is another object of the present invention to provide a sound producing device which will operate in response to the rotation of a handle about its longitudinal axis in one direction only.

Another object of the present invention is to provide a sound producing device which is suitably constructed for mass production operations.

A still further object of the present invention is to produce a sound producing device which is relatively simple and inexpensive to manufacture.

A still further object of the present invention is to produce a sound producing device which is durable in construction.

The above, and other objects, features and advantages of the present invention will be apparent from the following detailed description of an illustrative embodiment thereof, which is to be read in connection with the accompanying drawings, wherein:

FIG. 3 is a side sectional view of the sound producing mechanism illustrated in FIG. 1;

FIG. 4 is a sectional view taken along line 4—4 of FIG. 3;

FIG. 4A is a sectional view taken along line 4A—4A in FIG. 3;

FIG. 5 is a sectional view taken along line 5—5 in FIG. 4;

FIGS. 6A and 6B are partial plan views showing the cooperation between the wear or contact element of the resonator cone and the striker portion of the sound producing device; and FIGS. 7A and 7B illustrate the operation of the one-way clutch incorporated in the sound producing device of the present invention.

Figure 1:
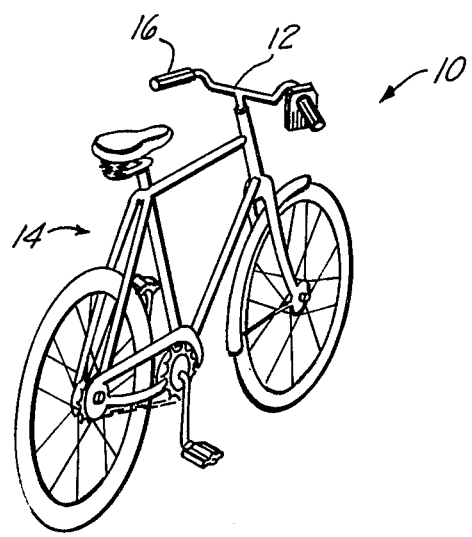
FIG. 1 is a perspective view of a bicycle having a sound producing device constructed in accordance with the present invention mounted thereon.

Referring now to the drawing in detail and initially to FIG. 1 thereof, a sound producing device 10, constructed in accordance with the present invention, is shown mounted on the handlebar 12 of a bicycle 14. In particular, the sound producing device 10 replaces the handlebar grip 16 conventionally associated with the end of a handlebar, and allows the bike rider to simulate the actions of a motorcyclist in rotating or twisting the handle of a motorcycle in order to "gun" or "race" his motorcycle's engine and produce a "roaring" sound.

As seen in FIG. 3 the sound producing device 10 includes a two-part housing 18 having front and rear sections 18A, 18B secured together in any convenient manner as for example by screws or bolts and the like (not shown). The inner housing section 18A has an aperture 20 formed therein through which the end 22 of the bicycle handlebar 12 is received. A clamp arrangement 24 within the housing 10, as more fully described hereinafter, firmly holds the housing on the end of the handlebar.

The outer side 18B of housing 10 includes an aperture 26 in which a handle 28 is rotatably mounted. The handle 28 is generally cylindrical in form and has an annular sleeve 30 formed thereon located within the housing so as to prevent the handle from being pulled out of the opening 26. Movement of the handle inwardly of the housing is prevented by three pins (one of which, pin 27, is seen in FIG. 3) on mounting plate 96 located in the housing as described hereinafter.

The sound producing device includes a resonant cone type diaphragm 32 formed of styrene or other similar flexible, yet somewhat rigid, material which is mounted with its base 34 on the inner-side of the housing section 18A. Preferably this housing section has apertures 36 formed therein (see FIG. 5) which will allow sound produced by the vibrating diaphragm to escape from the housing. The periphery of the diaphragm 32 is held on base 34 by a retainer ring 35 sonically welded to base 34.

The cone shaped diaphragm includes a metal contact element or wear tip 38 at its apex. This tip is cyclically engaged by contact elements 40 on a rotatable striker disc 42, to vibrate the cone and produce the desired sound.

Figure 2:
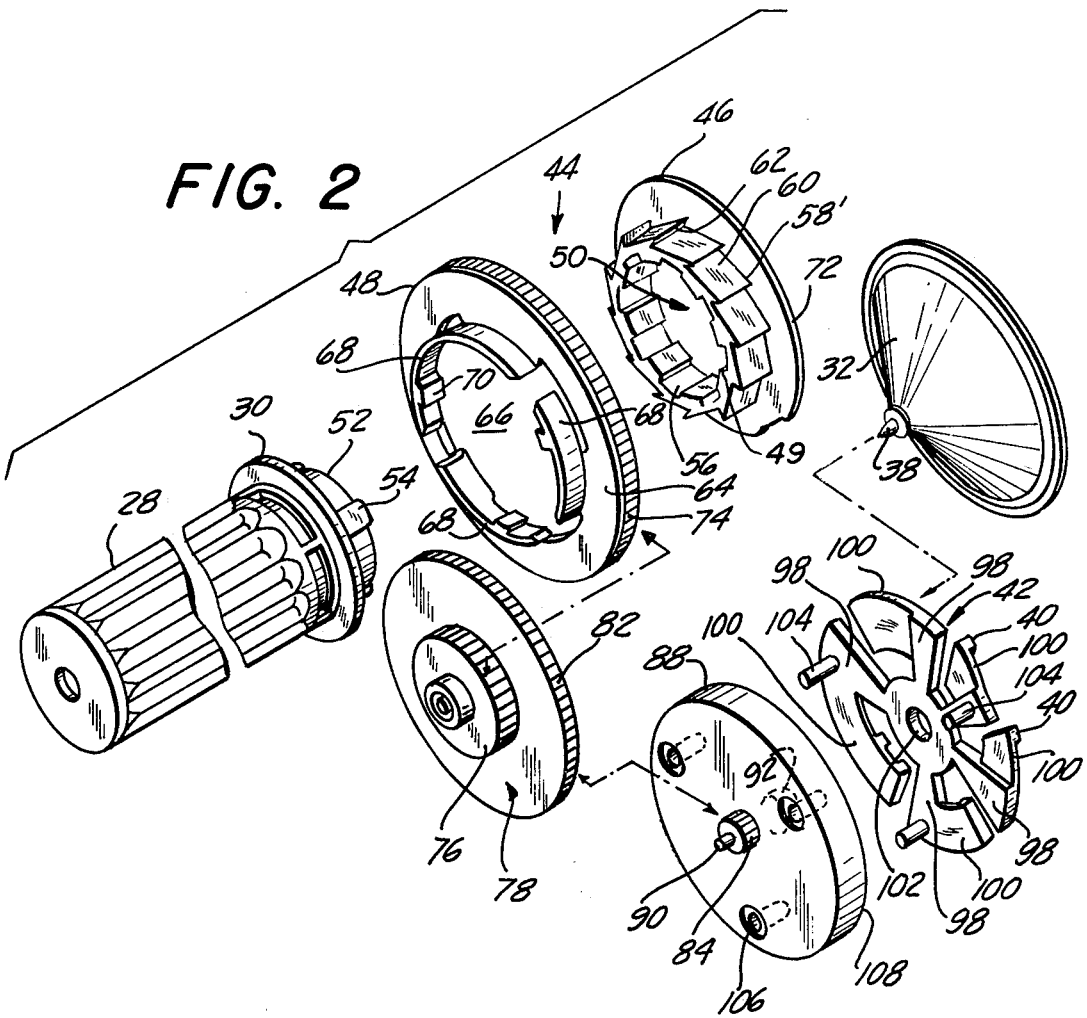
FIG. 2 is an exploded perspective view of a sound producing device constructed in accordance with the present invention, with the housing surrounding the illustrated elements being removed.

Striker disc 42 is driven through a transmission system most clearly illustrated in FIGS. 2 and 3. This transmission system includes a one-way clutch 44 which consists of a pair of clutch elements or plates 46, 48. The first clutch plate 46 consists of a sleeve or ring 49 having a notched inner aperture or bore 50 that receives the inner end 52 of handle 28. The end 52 of the handle has a plurality of radially extending protuberances or bosses 54 formed thereon which are received in the complementary inwardly extending radial notches 56 of sleeve 49. The outer periphery of sleeve 49 includes a plurality of ratchet teeth 58 which have inclined ramp surfaces 60 and angularly related and generally radially extending abutment surfaces 62 formed thereon.

The second clutch element 48 consists of a ring 64 having an opening 66 formed therein which receives the sleeve 49 of clutch element 46. Ring 64 includes a plurality (three, in the illustrative embodiment) of curved resilient fingers 68 overlying the toothed periphery of sleeve 49. These resilient fingers 68 (the two clutch elements are preferably formed of a molded plastic material such as for example CELCON) have inner teeth elements 70 which cooperate with and normally engage the surface of the ratchet teeth 58 of the first clutch element.

By this arrangement when the handle 28 is rotated in a clockwise direction (as seen in FIG. 7B) the abutment surfaces 62 of the ratchet teeth of clutch plate 46 are driven into engagement with the teeth elements 70 of the resilient fingers 68 whereby ring 64 is rotated with the clutch plate. On the other hand, when rotation of the handle 28 is reversed the abutments 70 on fingers 68 will ride over the ramp surfaces 60 of the ratchet teeth 58, as seen in FIG. 7B, so that rotation of the handle is not transmitted to ring 64. Thus the second clutch element 48 is driven only when handle 28 is rotated about its longitudinal axis in a clockwise direction as seen in FIG. 7A.

It is noted that the first clutch element 46 includes a radially extending annular flange 72 which overlies the front face of ring 64 (see FIGS. 3 and 4) and thereby holds ring 64 in position over the ratchet sleeve 49 on the handle 28.

The periphery 74 of clutch ring 64 is formed with gear teeth and constitutes a gear element in the transmission system of the device. The gear teeth 74 engage the smaller gear 76 of a compound pound gear 78. This gear is rotatably mounted in housing 10 in any convenient manner, as for example in a boss 80 formed in the rear housing section 18B (see FIG. 5). The larger gear section 82 of compound gear 78 is drivingly engaged with a pinion gear 84. The latter is integrally formed with a relatively heavy, preferably metal, flywheel 88 which provides inertia in the system so that the sound producing mechanism will continue to produce sound even when the handle 28 is rotated in the non-sound producing direction.

Flywheel 88 includes an integral shaft 90 which is rotatably mounted at one end in a boss 92 formed in housing section 18B and at its other end end in a pocket or boss 94 formed in an intermediate mounting plate 96 contained within housing 10. Plate 96 is clamped in a fixed position within housing 10 between housing sections 18A and 18B, in any convenient manner. The plate covers the transmission system and flywheel between itself and housing section 18B.

The striker element or disc 42, as seen in FIGS. 2 and 5, has a generally disc shaped configuration and includes a plurality of radially extending arms 98 formed thereon. Each of these arms includes a circumferentially extending finger 100 integrally formed therewith. Disc 42 has a central aperture 102 which receives a portion of shaft 92 of the flywheel, while pins 104 extending from arms 98 are received in apertures 106 formed in the flywheel adjacent its periphery. By this arrangement disc 42 is fixed to the flywheel for rotation therewith. It is noted that disc 42 is preferably formed of a resilient plastic material with the circumferential fingers 100 being thinner than their associated arms 98 and, as seen in FIGS. 5 and 6, spaced from the adjacent face 108 of the flywheel.

As is apparent from the drawings the flywheel is rotatably mounted in a plane which extends parallel to the plane in which the base of the resonant cone 32 is located. The axis of the cone and the shaft of the flywheel are offset with respect to one another so that the contact element 38 of the cone is located adjacent to but inwardly of the periphery of the striker wheel. The face of the striker wheel which faces the contact element 38 includes the striker elements 40 thereon. These elements are formed on the fingers 100, and are spaced in any desired pattern or sequence. As seen in FIG. 5 the plate 96 has an opening 101 formed therein in general alignment with the axis of cone 32 so that the apex of the cone enters this opening and the cone's contact element can engage the striker element 40.

Preferably the flywheel is located so that the contact element 38 will be spaced from or just barely touch the facing surface of the fingers 100 in position to be cyclically engaged by the striking elements 40, which simply are protuberances formed on the fingers 100. By this arrangement when the flywheel is rotated striker elements 40 will produce a sharp impact on the contact element of the cone to vibrate the cone and create the sound. When the striker element passes the contact element, there will be a minimum of damping of the cone so that an efficient sound production from the cone is achieved.

The arrangement of the striker disc 40 used in the present invention has the additional advantage that it can accommodate inadvertent misalignments between the disc or striker wheel and the sound producing cone without materially affecting the operation of the device. That is, as the device of the present invention is primarily intended as a mass production toy item, using molded plastic parts, it is possible that from time to time the tolerances required to properly and accurately align the striker disc with respect to the contact element 38 in the optimum design position will not be met. Thus the striker disc may be positioned closer to the contact element 38 than is necessary because of inaccuracies in the mounting of the flywheel in the bosses 92, 94, for example, or the cone may extend further through opening 101 then is required. In that event, resilient arms 100 of the striker disc will accommodate such misalignment. For example, as seen in FIG. 6A, if the flywheel 88 is positioned closer to the contact element 38 than the optimum (illustrated in FIG. 6B) the arms 100 will flex inwardly towards the flywheel to accommodate this misalignment. This flexing is permitted of course by the spacing of the arms 100 with respect to the flywheel on which the striker disc is mounted. In this manner the cone 32 is not undesirably compressed by the misalignment between the elements, and the sound which it produces is not materially affected.

In order to mount the sound producing device of the present invention on the handlebar 16 of a bicycle, the two element clamp arrangement 24 is provided in housing part 18A. As seen in FIGS. 3 and 4A, housing section 18A includes molded mounting elements or supports 112 formed therein. Metal brackets 116, 118, are respectively supported at their ends in the slots 120, 122 formed in the supports 112. The lower bracket 116 has threaded apertures 124 formed therein which receive threaded screws 126 that extend from upper bracket 118. These brackets each have semi-cylindrical bends 128 formed therein which receive the handlebar end 22 inserted in aperture 20 of the housing. Preferably the housing has openings or ports 130 formed therein through which a screw driver can be inserted in order to rotate the screws 126 in the proper direction to move the clamps 116, 118, closer or further apart in order to accommodate the handlebar and clamp it in position.

Accordingly it is seen that a relatively simply constructed yet durable sound producing device enables the user to simulate the action of the operator of a conventional motorcycle in "gunning" or "racing" his cycle's engine by cyclically rotating the hand grip on the handlebars of his vehicle in opposite directions. By the provision of the flywheel in the sound producing device the rotary movement of the handle is stored in the flywheel and the flywheel will be accelerated through a series of rapid rotations of the handle so that the operator can sequentially increase the amount of sound produced by successive oscillations of the handle. Moreover since rotation of the handle drives the sound producing vibrator cone only when the handle is rotated in one direction the increase in sound occurs only when the handle is rotated in that one direction thereby realistically simulating what actually occurs when a motorcycle engine is "raced".

Although an illustrative embodiment of the present invention has been described herein with reference to the accompanying drawings, it is to be understood that the invention is not limited to that precise embodiment, but that various changes and modifications may be effected therein by one skilled in the art without departing from the scope or spirit of this invention.

What is claimed is:

1. A device for producing sound comprising a housing, an elongated handle rotatably mounted in said housing for rotation in opposite directions about the handle's longitudinal axis, resonator means mounted in said housing for producing noise when struck, striker means in said housing for striking said resonator in response to rotation of said handle, and transmission means for transmitting rotational movement from said handle to said striker including clutch means for transmitting rotary movement between the handle and the striker means only when the handle is rotated in a first direction about its longitudinal axis; said clutch means including a first clutch plate mounted on said handle for rotation therewith and a second clutch plate rotatably mounted with respect to said first clutch plate; said first and second clutch plates including cooperating means for transmitting rotation from said first clutch plate to said second clutch plate only when the handle is rotated in said first direction.

2. The device as defined in claim 1 wherein said first clutch plate includes a sleeve receiving one end of said handle within said housing for rotation therewith, and said second clutch plate comprises a ring surrounding the sleeve of the first clutch plate; said ring and sleeve having said cooperating means formed thereon.

3. The device as defined in claim 2 wherein said cooperating means comprises a plurality of inclined ratchet teeth formed on the periphery of said sleeve having inclined ramp surfaces and angularly related abutment surfaces and at least one radially movable spring finger formed on said ring contacting said ratchet teeth, said at least one spring finger engaging one of said abutment surfaces when the handle and sleeve are rotated in said first direction to transmit movement to said striker and riding over said ramp surfaces when the handle is rotated in the direction opposite to said first direction.

4. The device as defined in claim 3 wherein said first clutch plate includes an annular flange radially extending from said sleeve and overlying at least a portion of said ring to hold said ring on the sleeve.

5. A device for producing sound comprising a housing, an elongated handle rotatably mounted in said housing for rotation in opposite directions about the handle's longitudinal axis, resonator means mounted in said housing for producing noise when struck, striker means in said housing for striking said resonator in response to rotation of said handle, and transmission means for transmitting rotational movement from said handle to said striker including clutch means for transmitting rotary movement between the handle and the striker means only when the handle is rotated in a first direction about its longitudinal axis; said transmission means including a flywheel driven from said clutch and said striker comprising a disc rotated by said flywheel and having at least one contact surface thereon for cyclically striking said resonator means during rotation of the flywheel.

6. The device as defined in claim 5 wherein said disc includes a plurality of circumferentially extending resilient fingers and is rotatably mounted in said housing with one side of the disc facing the resonator means; at least one of said fingers having a contact surface formed thereon for striking the resonator means.

7. The device as defined in claim 6 wherein each of said striker fingers has as least one resonator contact surface formed thereon.

8. The device as defined in claim 7 wherein said flywheel is rotatably mounted in said housing with one side thereof facing said resonator means and said striker disc is mounted on said one side of the flywheel for rotation therewith; said striker fingers being spaced from said flywheel to permit the fingers to flex toward the flywheel.

9. A device for producing sound comprising a housing having an aperture therein; an elongated handle including inner and outer end portions rotatably mounted in said aperture for rotation in opposite directions about the handle's longitudinal axis, with the inner end portion thereof located within said housing, resonator means, including a contact element, mounted in said housing for producing sound when said contact element is struck; striker means rotatably mounted in said housing for striking said contact element when rotated, and transmission means in said housing for selectively transmitting rotation movement of the handle to the striker including clutch means for transmitting rotary movement between the handle and the striker means when the handle is rotated in a first direction about its longitudinal axis, but not when the handle is rotated in an opposite direction; such means including first and second clutch elements respectively comprising a sleeve secured to said inner end of the handle for rotation therewith and a ring surrounding said sleeve, said sleeve and ring including cooperating means for transmitting rotation from said sleeve to said ring when said handle is rotated in said first direction but not when the handle is rotated in an opposite direction.

10. The device as defined in claim 9 wherein said sleeve includes an annular radially extending flange formed thereon overlying at least a portion of said ring thereby to capture said ring on the sleeve between said flange and housing.

11. The device as defined in claim 10 wherein said handle has a radially extending flange formed thereon located with the housing adjacent said aperture and a diameter larger than the maximum dimension of said aperture to normally prevent removal of the handle from said housing.

12. The device as defined in claim 10 wherein said cooperating means comprises a plurality of inclined ratchet teeth formed on the periphery of said sleeve having inclined ramp surfaces and angularly related abutment surfaces and at least one radially movable spring finger formed on said ring contacting said ratchet teeth, said at least one spring finger engaging one of said abutment surfaces when the handle and sleeve are rotated in said first direction to transmit movement to said striker and riding over said ramp surfaces when the handle is rotated in the direction opposite to said first direction.

13. The device as defined in claim 10 wherein said transmission means includes a gear drive train from said clutch means to said striker means and said ring has an annular periphery including gear teeth formed thereon for driving said gear drive train.

14. A device for producing sound comprising a housing having an aperture therein; an elongated handle including inner and outer end portions rotatably mounted in said aperture for rotation in opposite directions about the handle's longitudinal axis, with the inner end portion thereof located within said housing, resonator means, including a contact element, mounted in said housing for producing sound when said contact element is struck; striker means rotatably mounted in said housing for striking said contact element when rotated, and transmission means in said housing for selectively transmitting rotational movement of the handle to the striker including clutch means for transmitting rotary movement between the handle and the striker means when the handle is rotated in a first direction about its longitudinal axis, but not when the handle is rotated in an opposite direction; said transmission means including a flywheel driven from said clutch and said striker comprising a disc rotated by said flywheel and having at least one contact surface thereon for cyclically striking said contact element during rotation of the flywheel.

15. The device as defined in claim 14 wherein said resonator means comprises a resonant cone having said contact element located at the apex thereof and said striker disc is rotatably mounted in said housing in a plane spaced from and generally parallel to the plane of the base of the cone and adjacent its apex with the contact surface thereof facing the cone.

16. The device as defined in claim 15 wherein said striker disc includes a plurality of circumferentially extending resilient fingers located along its periphery with said fingers lying in substantially the same plane parallel to and spaced from the plane of the base of said resonator cone; each of said striker fingers having at least one resonator contact surface formed thereon for striking the contact element of the cone when the disc is rotated.

17. The device as defined in claim 16 wherein said flywheel is rotatably mounted in said housing in a plane parallel to the plane of the base of said resonator cone, and said striker disc is mounted on said flywheel for rotation therewith between the flywheel and the contact element of the cone; said striker fingers being spaced from said flywheel to permit the fingers of the disc to flex towards the flywheel.

18. A device for producing sound comprising a housing, resonator means, including a contact point, mounted in said housing for producing noise when its contact point is struck, a striker disc rotatably mounted in said housing for rotation in a plane extending generally perpendicularly to the plane in which said contact point is located and including at least one striker element for cyclically engaging said contact point when the disc is rotated, and means for rotating the disc; said striker disc including at least one circumferentially extending resilient finger lying in the plane of the disc and carrying said striker element whereby the finger and striker element may flex with respect to the resonator means.

19. A device as defined in claim 18 wherein said disc includes a plurality of circumferentially extending resilient fingers lying in the plane of the disc, with each of said fingers carrying at least one striker element thereon.

20. A device as defined in claim 19 wherein said means for rotating the disc include a rotatable flywheel and said disc is mounted on said flywheel.

21. The device as defined in claim 20 wherein said disc fingers extend parallel to but are spaced from the flywheel whereby the fingers can flex toward the flywheel to accommodate lateral misalignment between the flywheel and resonator means.

22. A device for producing sound comprising a housing, resonator means mounted in said housing for producing noise when struck and including a resonant cone having a contact element located at the apex thereof, a striker disc rotatably mounted in said housing in a plane which is spaced from and generally parallel to the plane of the base of the cone and which is adjacent and perpendicular to the contact element of the cone, and means for rotating the disc; said striker disc including at least one circumferentially extending resilient finger lying in the plane of the disc and carrying, on the side thereof facing the cone's contact element, a striker element for cyclically striking the contact element when rotated to produce noise in the cone, said finger being adapted to flex perpendicularly to the plane of the disc to accommodate lateral misalignment of the disc and contact element.

23. The device as defined in claim 22 wherein the axis of rotation of the disc is offset from the apex of the cone in a predetermined position whereby the contact element of the cone is located adjacent to but inwardly of the periphery of the disc to engage said finger.

24. The device as defined in claim 22 wherein said disc includes a plurality of circumferentially extending resilient fingers lying in the plane of the disc, with each of said fingers carrying at least one striker element thereon.

25. The device as defined in claim 23 wherein said means for rotating the disc include a rotatable flywheel and said disc is mounted on said flywheel.

26. The device as defined in claim 24 wherein said disc fingers extend parallel to but are spaced from the flywheel whereby the fingers can flex toward the flywheel to accommodate lateral misalignment between the flywheel and resonator means.

* * * * *